United States Patent
Peddi et al.

(10) Patent No.: US 11,987,136 B2
(45) Date of Patent: May 21, 2024

(54) CURRENT OBSERVER FOR CURRENT REGULATOR OF VEHICLE ELECTRIC TRACTION MOTOR

(71) Applicant: GM Global Technology Operations LLC, Detroit, MI (US)

(72) Inventors: Vinod Chowdary Peddi, Shelby Township, MI (US); Muhammad Hussain Alvi, Troy, MI (US); Lei Hao, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 345 days.

(21) Appl. No.: 17/490,069

(22) Filed: Sep. 30, 2021

(65) Prior Publication Data
US 2023/0099460 A1    Mar. 30, 2023

(51) Int. Cl.
*B60L 15/20* (2006.01)
*B60W 10/08* (2006.01)

(52) U.S. Cl.
CPC ......... *B60L 15/2054* (2013.01); *B60W 10/08* (2013.01); *B60L 2210/40* (2013.01); *B60L 2240/423* (2013.01); *B60L 2240/429* (2013.01)

(58) Field of Classification Search
CPC ............ B60L 15/2054; B60L 2210/40; B60L 2240/423; B60L 2240/429; B60W 10/08
See application file for complete search history.

(56) References Cited

U.S. PATENT DOCUMENTS

| | | | |
|---|---|---|---|
| 2012/0109431 A1* | 5/2012 | Wang | B60L 50/16 903/902 |
| 2014/0288753 A1* | 9/2014 | Engdahl | B60L 3/12 180/65.265 |
| 2015/0005988 A1* | 1/2015 | Cox | B60L 15/2009 701/3 |
| 2016/0373040 A1* | 12/2016 | Auer | H02P 9/04 |
| 2017/0126161 A1* | 5/2017 | Hijikata | H02K 16/02 |
| 2018/0091074 A1* | 3/2018 | Pramod | B62D 5/0463 |
| 2018/0162372 A1* | 6/2018 | Colavincenzo | B60L 58/20 |
| 2019/0375421 A1* | 12/2019 | Asher | B60W 20/10 |
| 2023/0116964 A1* | 4/2023 | Sun | F24F 11/63 700/276 |

* cited by examiner

*Primary Examiner* — Behrang Badii
*Assistant Examiner* — Jay Khandpur
(74) *Attorney, Agent, or Firm* — CANTOR COLBURN LLP

(57) ABSTRACT

A system in a vehicle includes a current regulator to obtain current commands from a controller based on a torque input and provide voltage commands and an inverter to use the voltage commands from the current regulator and direct current (DC) supplied by a battery to provide alternating current (AC). An electric traction motor provides drive power to a transmission of the vehicle based on injection of the AC from the inverter. A current observer obtains measured input current signals based on the AC for a current control cycle and provides predicted current signals for a next control cycle to the current regulator using a model. The current observer includes a controller to check output of the model against the measured input current signals. The current observer tunes parameters of the controller and the model used to generate the predicted current signals based on the measured input current signals.

19 Claims, 7 Drawing Sheets

CURRENT OBSERVER FOR CURRENT REGULATOR OF VEHICLE ELECTRIC TRACTION MOTOR

INTRODUCTION

The subject disclosure relates to a current observer for a current regulator of a vehicle electric traction motor.

A vehicle (e.g., automobile, truck, construction equipment, farm equipment) that is a battery electric vehicle (BEV) or an electric hybrid vehicle uses a traction motor, which is an electric motor, for propulsion instead of or in addition to an internal combustion engine. The traction motor may be an interior permanent magnet (IPM) motor with magnets embedded in the rotor. As a result, while a surface permanent magnet motor has a permanent magnet attached to the rotor surface and only uses magnetic torque from the magnet, the IPM motor uses reluctance through magnetic resistance in addition to magnetic torque. A torque input (e.g., via an accelerator pedal operated by a driver) is used to convert direct current (DC) from the vehicle battery to an alternating current (AC) to the IPM motor to achieve the torque requested by the torque input. This torque is supplied to the power transfer unit that turns the wheels. The traction motor drive system includes a current regulator between the torque input and the IPM motor. The current regulator obtains inputs, including from a current observer. Accordingly, it is desirable to provide a current observer for a current regulator of a vehicle electric traction motor.

SUMMARY

In one exemplary embodiment, a system in a vehicle includes a current regulator to obtain current commands from a controller based on a torque input and provide voltage commands, and an inverter to use the voltage commands from the current regulator and direct current (DC) supplied by a battery to provide alternating current (AC). An electric traction motor provides drive power to a transmission of the vehicle based on injection of the AC from the inverter. A current observer obtains measured input current signals based on the AC for a current control cycle and provides predicted current signals for a next control cycle to the current regulator using a model. The current observer includes a controller to check output of the model against the measured input current signals, and the current observer tunes parameters of the controller and the model used to generate the predicted current signals based on the measured input current signals.

In addition to one or more of the features described herein, the system also includes a converter to convert the AC, which is a three-phase AC, to input direct-axis current and input quadrature-axis current as the measured input current signals for the current control cycle. The predicted current signals for the next control cycle include a direct-axis predicted current and a quadrature-axis predicted current, and the current observer includes a separate set of the controller and the model specific to the direct-axis predicted current and to the quadrature-axis predicted current.

In addition to one or more of the features described herein, a bandwidth of the controller specific to the direct-axis predicted current and a bandwidth of the controller specific to the quadrature-axis predicted current have independent adjustments to reject errors in a sensor that measures the AC.

In addition to one or more of the features described herein, the parameters of the controller and the model specific to the direct-axis predicted current and the parameters of the controller and the model specific to the quadrature-axis predicted current are tuned according to look-up tables, polynomial functions, partial derivatives of surface maps of direct-axis and quadrature-axis flux versus current, or an online derivative calculation.

In addition to one or more of the features described herein, the current observer uses the quadrature-axis predicted current to obtain the direct-axis predicted current or the current observer uses the direct-axis predicted current to obtain the quadrature-axis predicted current.

In addition to one or more of the features described herein, the current observer uses the quadrature-axis predicted current to obtain the direct-axis predicted current and the current observer also uses the direct-axis predicted current to obtain the quadrature-axis predicted current.

In addition to one or more of the features described herein, the current observer additionally tunes a direct-axis static inductance parameter of the model used to provide the quadrature-axis predicted current based on the input quadrature-axis current.

In addition to one or more of the features described herein, the current observer additionally tunes a quadrature-axis static inductance parameter of the model used to provide the direct-axis predicted current based on the input quadrature-axis current.

In addition to one or more of the features described herein, a delayed version of the direct-axis predicted current is checked with the input direct-axis current and a delayed version of the quadrature-axis predicted current is checked with the input quadrature-axis current.

In addition to one or more of the features described herein, the current observer is configured to select the model and tune of the parameters of the model according to a ratio of a sampling frequency to a frequency of the electric traction motor.

In another exemplary embodiment, a method in a vehicle includes arranging a current regulator to obtain current commands from a controller based on a torque input and provide voltage commands, and arranging an inverter to use the voltage commands from the current regulator and direct current (DC) supplied by a battery to provide alternating current (AC). An electric traction motor is arranged to provide drive power to a transmission of the vehicle based on injection of the AC from the inverter. A current observer is configured to obtain measured input current signals based on the AC for a current control cycle and to provide predicted current signals for a next control cycle to the current regulator using a model. The current observer includes a controller to check output of the model against the measured input current signals, and the current observer tunes parameters of the controller and the model used to generate the predicted current signals based on the measured input current signals.

In addition to one or more of the features described herein, the method also includes arranging a converter between the inverter and the current observer to convert the AC, which is a three-phase AC, to input direct-axis current and input quadrature-axis current as the measured input current signals for the current control cycle, wherein the predicted current signals for the next control cycle include a direct-axis predicted current and a quadrature-axis predicted current, and the current observer includes a separate set of the controller and the model specific to the direct-axis predicted current and to the quadrature-axis predicted current.

In addition to one or more of the features described herein, the method also includes independently adjusting a bandwidth of the controller specific to the direct-axis predicted current and a bandwidth of the controller specific to the quadrature-axis predicted current to reject errors in a sensor that measures the AC.

In addition to one or more of the features described herein, the tuning the parameters of the controller and the model specific to the direct-axis predicted current and the parameters of the controller and the model specific to the quadrature-axis predicted current is according to look-up tables, polynomial functions, partial derivatives of surface maps of direct-axis and quadrature-axis flux versus current, or an online derivative calculation.

In addition to one or more of the features described herein, the method also includes the current observer using the quadrature-axis predicted current to obtain the direct-axis predicted current or using the direct-axis predicted current to obtain the quadrature-axis predicted current.

In addition to one or more of the features described herein, the method also includes the current observer using the quadrature-axis predicted current to obtain the direct-axis predicted current and the current observer also using the direct-axis predicted current to obtain the quadrature-axis predicted current.

In addition to one or more of the features described herein, the method also includes the current observer additionally tuning a direct-axis static inductance parameter of the model used to provide the quadrature-axis predicted current based on the input quadrature-axis current.

In addition to one or more of the features described herein, the method also includes the current observer additionally tuning a quadrature-axis static inductance parameter of the model used to provide the direct-axis predicted current based on the input quadrature-axis current.

In addition to one or more of the features described herein, the method also includes checking a delayed version of the direct-axis predicted current with the input direct-axis current and checking a delayed version of the quadrature-axis predicted current with the input quadrature-axis current.

In addition to one or more of the features described herein, the method also includes the current observer selecting the model and tuning the parameters of the model according to a ratio of a sampling frequency to a frequency of the electric traction motor.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
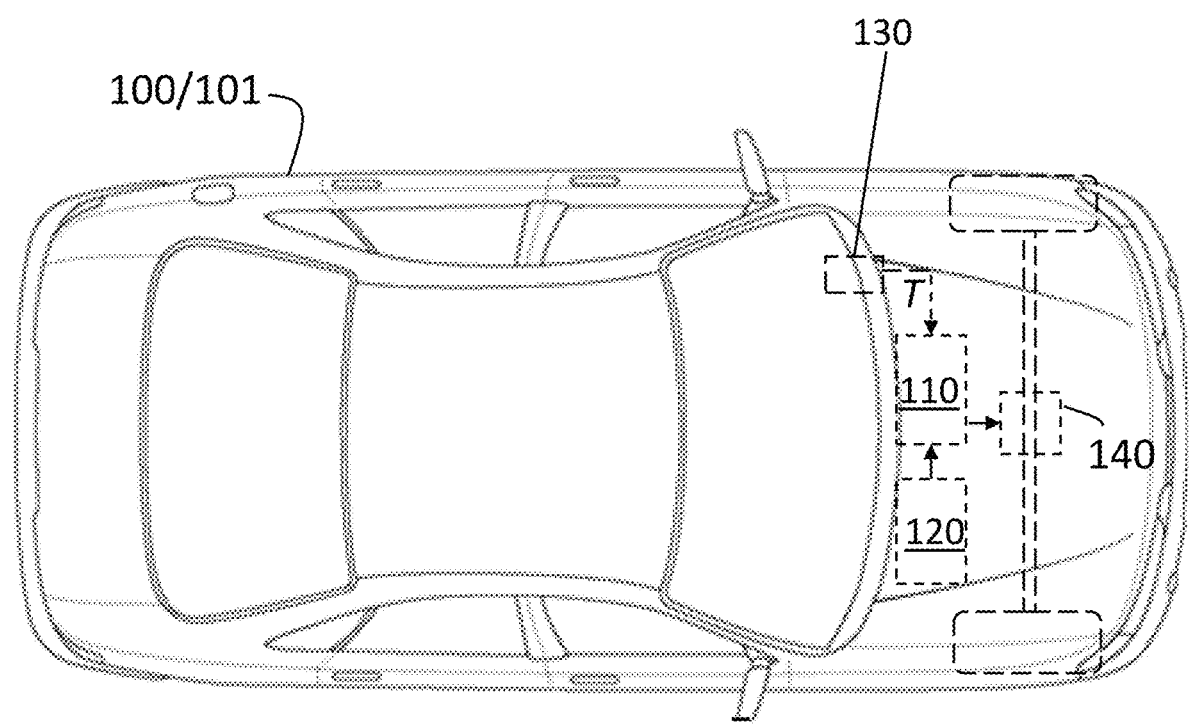
FIG. 1 is a block diagram of a vehicle with a current observer for a current regulator of an electric traction motor in an electric traction system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a traction system with an IPM motor is used for propulsion in a BEV or hybrid vehicle. A current regulator between the torque input and the IPM motor controls the current provided to the IPM motor to achieve the requested torque. Embodiments of the systems and methods detailed herein relate to a current observer for a current regulator of a vehicle electric traction motor. The current regulator relies on feedback from the current observer that consumes the measured current provided to the IPM motor at a control cycle k as an input and predicts the direct axis d and quadrature axis q current signals $I_d$, $I_q$ at the next control cycle k+1. Different exemplary embodiments are detailed for the prediction In accordance with an exemplary embodiment, FIG. 1 is a block diagram of a vehicle 100 with a current observer 255 (FIG. 2) for a current regulator 220 (FIG. 2) of an electric traction motor 260 (FIG. 2) in an electric traction system 110. The exemplary vehicle 100 shown in FIG. 1 is an automobile 101. The electric traction system 110, which includes the electric traction motor 260 (e.g., IPM), current regulator 220, and current observer 255, is coupled to a battery 120 that supplies DC and to a transmission 140, which transfers power to the drive wheels. The transmission 140 may be a hybrid transmission in the case of a gas-electric hybrid vehicle 100. The electric traction system 110 receives a torque input T originating from an input source 130 (e.g., accelerator pedal 130 in a driver-operated vehicle 100).

Figure 2:
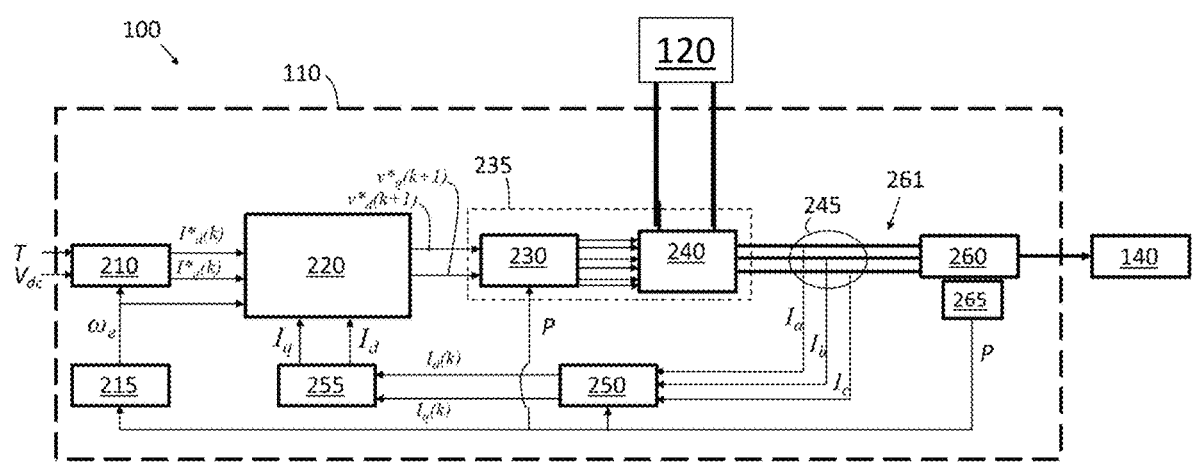
FIG. 2 is a block diagram detailing aspects of the electric traction system, which includes a current observer for a current regulator of the electric traction motor according to one or more embodiments.

The electric traction system 110, which is further detailed in FIG. 2, includes the current regulator 220 that provides voltage commands to a pulse width modulator (PWM) 230. As detailed in FIGS. 3-6, a current observer 255 provides a prediction of current signals $I_d$, $I_q$ at the next control cycle k+1 to the current regulator 220. Using, in part, this prediction, the current regulator 220 controls the three-phase alternating current (AC) 261 (FIG. 2) that is injected into the electric traction motor 260 to affect the torque that produces drive power at the output of the electric traction motor 260.

FIG. 2 is a block diagram detailing aspects of the electric traction system 110, which includes a current observer 255 for a current regulator 220 of the electric traction motor 260 according to one or more embodiments. The torque input T is provided to a controller 210 that generates direct-axis d and quadrature-axis q current commands $I^*_d$ and $I^*_q$, respectively. A measured value of direct current (dc) voltage $V_{dc}$ is also supplied to the controller 210. The controller 210 may implement a known maximum torque per ampere (MTPA) control strategy to generate and regulate the current commands $I^*_d$ and $I^*_q$ for the current control cycle k. According to exemplary embodiments, the controller 210 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The current regulator 220 generates direct-axis d and quadrature-axis q voltage commands for the next control cycle $v^*_d$ and $v^*_q(k+1)$ from the current commands $I^*_d$ and $I^*_q$ from the controller 210. The PWM 230 converts from the direct-axis d and quadrature-axis q to three-phase and provides the voltage commands $v^*_d$ and $v^*_q$ as three-phase inverter voltage control signals to a direct current-to-alternating current (DC-AC) converter 240 that obtains the DC from the battery 120 and provides three-phase AC 261 to the electric traction motor 260. Together, the PWM 230 and DC-AC converter 240 may be regarded as serving the function of an inverter 235 of the electric traction system 110. The three-phase AC 261 from the DC-AC converter 240 (i.e., the three-phase AC 261 current injection to the electric traction motor 260) is tapped as current sensor signals $I_a$, $I_b$, $I_c$ by a sensor 245, as indicated in FIG. 2. The electric traction motor 260 then provides drive power to the transmission 140 based on the injected three-phase AC 261. That is, the electric traction motor 260 produces a torque and motion that is transmitted to the wheels of the vehicle 100. The shaft position P of the electric traction motor 260 is sensed by an electric traction motor shaft position sensor 265.

As FIG. 2 indicates, there are feedbacks provided to the controller 210, the current regulator 220, and the PWM 230. The current sensor signals $I_a$, $I_b$, $I_c$ that are measured by the sensor 245 at the input of the electric traction motor 260 are fed back to the current regulator 220 through a converter 250 and a current observer 255. Other inputs to the current observer 255 are not shown in FIG. 2 but are discussed with reference to FIGS. 3-6. The converter 250 converts the current sensor signals $I_a$, $I_b$, $I_c$ to direct-axis d and quadrature-axis q current signals $I_d$ and $I_q$ in the current control cycle (k). The current observer 255 uses the current signals $I_d$ and $I_q$ in the current control cycle (k) and predicts current signals $I_d$ and $I_q$ in the next control cycle (k+1). The shaft position P, which is provided by the electric traction motor shaft position sensor 265, is provided to the PWM 230 and to the converter 250, which uses the shaft position P in converting the current sensor signals $I_a$, $I_b$, $I_c$ to direct-axis d and quadrature-axis q current signals. The shaft position P is also provided to a differentiator 215, which indicates shaft speed $\omega_e$ corresponding with the shaft position P. This shaft speed $\omega_e$ is used in both the controller 210 and the current regulator 220, as indicated, and also in the current observer 255.

As detailed with reference to FIGS. 3-6, the current observer 255 includes controllers 330, 430, 530, 630 and implements electric machine/motor models 370, 470, 570, 670, according to different exemplary embodiments, to predict the current signals $I_d$ and $I_q$ in the next control cycle (k+1). As discussed with reference to FIG. 7, the motor models may be selected according to alternate embodiments. The input from the current observer 255 allows the current regulator 220 to achieve the three-phase AC 261 that corresponds with the torque input T for injection into the electric traction motor 260. The three-phase AC 261 is used by the electric traction motor 260 to produce an electromagnetic torque. The application of this electromagnetic torque to the motor shaft results in mechanical torque sent to the transmission 140. The current regulator 220 controls the three-phase AC 261 directly in order to indirectly control the resulting electromagnetic torque required for the torque input T.

FIGS. 3-6 show schematic diagrams of the current observer 255 according to different exemplary embodiments. In each of the embodiments, the controllers 330, 430, 530, 630 ensure that the outputs of the motor models 370, 470, 570, 670 agree with the measured current signals $I_d$ and $I_q$ from the converter 250. This is detailed with reference to FIG. 4. The bandwidth of each of the controllers 330, 430, 530, 630 may be adjusted to reject errors in the current measurement sensor. The embodiments shown in FIGS. 3-5 relate to prediction models with relatively high sampling frequency Fs while the embodiment shown in FIG. 6 relates to a relatively low sampling frequency Fs. The embodiments associated with higher sampling frequency Fs (shown in FIGS. 3-5) include decoupling between the direct-axis d and quadrature-axis q terms.

Figure 3:
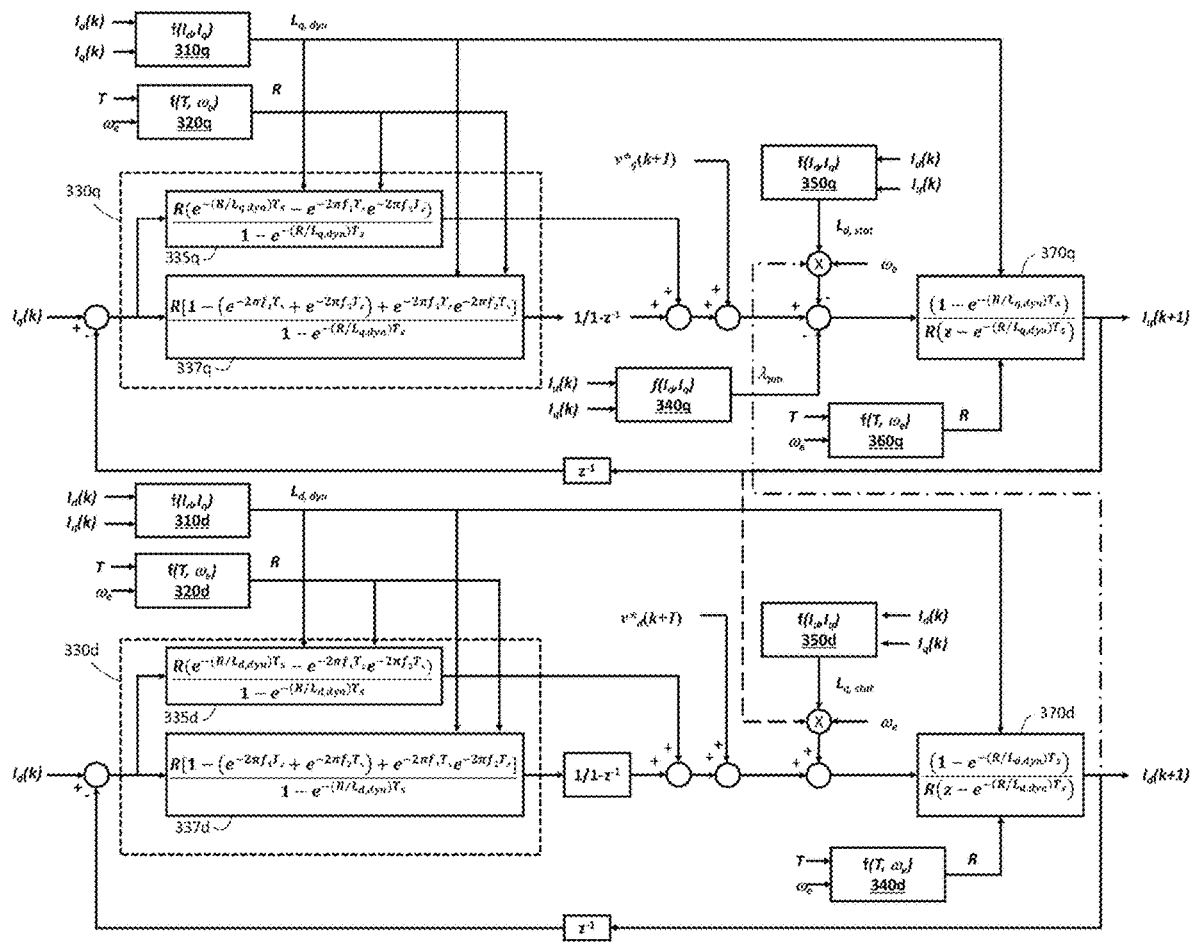
FIG. 3 is a schematic diagram of an exemplary current observer according to one or more embodiments.
Figure 4:
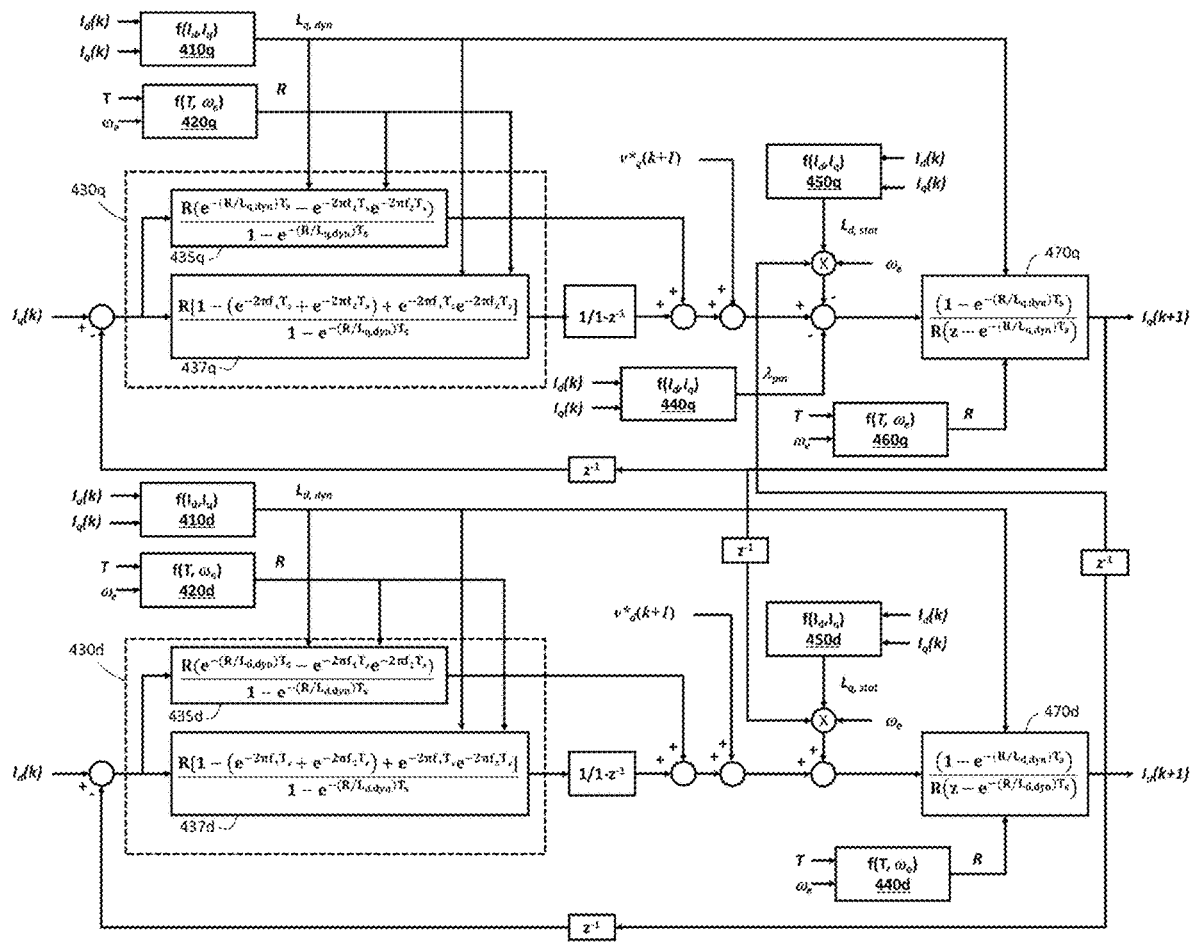
FIG. 4 is a schematic diagram of an exemplary current observer according to one or more embodiments.

In the embodiment of FIG. 3, either the predicted quadrature-axis current signal for the next control cycle $I_q(k+1)$ is used in the determination of the predicted direct-axis current signal for the next control cycle $I_d(k+1)$ or the predicted direct-axis current signal for the next control cycle $I_d(k+1)$ is used in the determination of the predicted quadrature-axis current signal for the next control cycle $I_q(k+1)$ to accomplish decoupling. In the embodiment of FIG. 4, the predicted quadrature-axis current signal for the next control cycle $I_q(k+1)$ is used in the determination of the predicted direct-axis current signal for the next control cycle $I_d(k+1)$ and, additionally, the predicted direct-axis current signal for the next control cycle $I_d(k+1)$ is used in the determination of the predicted quadrature-axis current signal for the next control cycle $I_q(k+1)$ to accomplish decoupling. Decoupling is addressed by additionally using the measured current signals $I_d$ and $I_q$ from the converter 250 in the embodiment shown in FIG. 5, as detailed. In FIG. 6, parameters used in the motor model accomplish decoupling.

FIG. 3 is a schematic diagram of an exemplary current observer 255 according to one or more embodiments. As FIG. 2 indicates, inputs to the current observer 255 include current signals $I_d(k)$ and $I_q(k)$ measured for the current control cycle by the sensor 245 and converted by the converter 250. As FIG. 3 indicates, additional inputs to the current observer 255 include the torque input T, shaft speed $\omega_e$ corresponding with the shaft position P, and the direct-axis d and quadrature-axis q voltage commands for the next control cycle $v^*_d$ and $v^*_q(k+1)$, which are generated by the current regulator 220. Aspects of the current observer 255 that are involved in the prediction of the direct-axis current signal for the next control cycle $I_d(k+1)$ are designated with "d" (e.g., 310d) and aspects that are involved in the prediction of the quadrature-axis current signal for the next control cycle $I_q(k+1)$ are designated with "q" (e.g., 330q). For explanatory purposes of common features, the designation is not included.

As previously noted, the current observer 255 includes controllers 330 (330d and 330q) and motor models 370 (370d and 370q). The transfer functions 335, 337 of the controllers 330 and the motor model 370 transfer functions that ultimately generates the predicted direct-axis current signal for the next control cycle $I_d(k+1)$ and the predicted quadrature-axis current signal for the next control cycle $I_q(k+1)$ may be any known transfer functions and may differ from those shown for explanatory purposes.

The parameters of one or more of the controllers 330 or motor models 370 may be tuned from control cycle to control cycle to provide a more accurate prediction of the current signals $I_d(k+1)$ and $I_q(k+1)$ for the subsequent control cycle. The parameters may be direct-axis d or quadrature-axis q and may be static (stat) or dynamic (dyn)

inductance L, resistance R, flux λpm of the electric traction motor 260. The blocks 310, 320, 340, 350, 360 that tune the parameters of the controller 330 and/or motor model 370 may provide the parameters based on a look-up table (LUT), a polynomial function, partial derivatives of a surface map of direct axis and quadrature axis flux versus current, $\lambda_d$ versus $I_d$ and $I_q$ and versus $I_d$ and $I_q$, respectively, or an online derivative calculation. In alternate embodiments, combinations of $I_d(k)$, $I_q(k)$, $I_d(k+1)$, $I_q(k+1)$, $I^*_d(k)$, $I^*_q(k)$ may be used find the accurate parameters. In addition, the frequencies $f_1$ and $f_2$ may be controlled to adjust the bandwidth of the controller 330 to reject errors in the sensor 245. The control of the frequencies $f_1$ and $f_2$ may be independent in the controllers 330d and 330q.

FIG. 3 illustrates two different embodiments. According to one exemplary embodiment, the predicted quadrature-axis current signal for the next control cycle $I_q(k+1)$ is used in the determination of the predicted direct-axis current signal for the next control cycle $I_d(k+1)$, as indicated by one of the dashed lines. According to another exemplary embodiment, the predicted direct-axis current signal for the next control cycle $I_d(k+1)$ is used in the determination of the predicted quadrature-axis current signal for the next control cycle $I_q(k+1)$, as indicated by another of the dashed lines.

FIG. 4 is a schematic diagram of an exemplary current observer 255 according to one or more embodiments. As previously noted, controllers 430d and 430q are used to ensure that motor models 470d and 470q, respectively, output predictions of current signals $I_d(k+1)$ and $I_q(k+1)$ that agree with the measured current signals $I_d(k)$ and $I_q(k)$ from the converter 250. As shown in FIGS. 3-6, each of the predicted current signals $I_d(k+1)$ and $I_q(k+1)$ is delayed ($z^{-1}$) and provided to the corresponding controller 430. The relevant dynamic inductances $L_{d,\,dyn}$ and $L_{q,\,dyn}$ output by blocks 410d and 410q, based on the measured current signals $I_d(k)$ and $I_q(k)$, respectively, are used in the transfer functions 435, 437 of the controllers 430. In alternate embodiments, combinations of $I_d(k)$, $I_q(k)$, $I_d(k+1)$, $I_q(k+1)$, $I^*_d(k)$, $I^*_q(k)$ may be used find the accurate parameters. As FIG. 4 indicates, and as is true for each of the embodiments, the controller 430 output affects subsequent input to the motor models 470.

As noted with reference to FIG. 3, parameters of one or more of the controllers 430 or motor models 470 may be tuned to provide a more accurate prediction of the current signals $I_d(k+1)$ and $I_q(k+1)$. The parameters may be direct-axis d or quadrature-axis q and may be static (stat) or dynamic (dyn) inductance L, resistance R, flux λpm of the electric traction motor 260. The blocks 410, 420, 440, 450, 460 that tune the parameters of the controller 430 and/or motor model 470 may provide the parameters based on a look-up table (LUT), a polynomial function, partial derivatives of a surface map of direct axis and quadrature axis flux versus current, $\lambda_d$ versus $I_d$ and $I_q$ and $\lambda_q$ versus $I_d$ and $I_q$, respectively, or an online derivative calculation. In alternate embodiments, combinations of $I_d(k)$, $I_q(k)$, $I_d(k+1)$, $I_q(k+1)$, $I^*_d(k)$, $I^*_q(k)$ may be used find the accurate parameters. In addition, the frequencies $f_1$ and $f_2$ may be controlled to adjust the bandwidth of the controller 430 to reject errors in the sensor 245. The control of the frequencies $f_1$ and $f_2$ may be independent in the controllers 430d and 430q.

As previously noted, FIG. 3 illustrates exemplary embodiments in which either the predicted quadrature-axis current signal for the next control cycle $I_q(k+1)$ is used in the determination of the predicted direct-axis current signal for the next control cycle $I_d(k+1)$ or the predicted direct-axis current signal for the next control cycle $I_d(k+1)$ is used in the determination of the predicted quadrature-axis current signal for the next control cycle $I_q(k+1)$. FIG. 4 illustrates an exemplary embodiment in which the predicted quadrature-axis current signal for the next control cycle $I_q(k+1)$ is used in the determination of the predicted direct-axis current signal for the next control cycle $I_d(k+1)$ and, additionally, the predicted direct-axis current signal for the next control cycle $I_d(k+1)$ is used in the determination of the predicted quadrature-axis current signal for the next control cycle $I_q(k+1)$. As shown, the predicted current signals $I_d(k+1)$ and $I_q(k+1)$ are delayed ($z^{-1}$).

Figure 5:
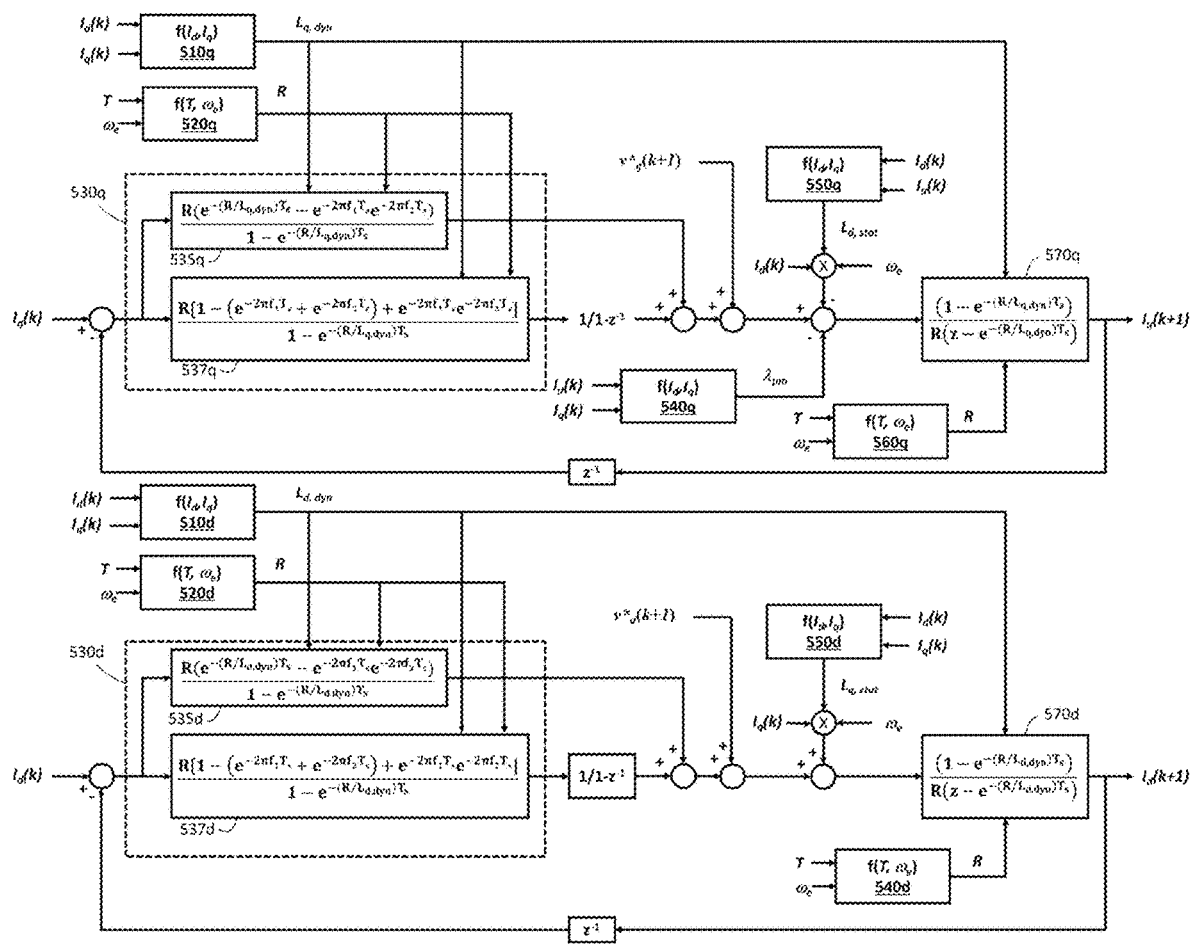
FIG. 5 is a schematic diagram of an exemplary current observer according to one or more embodiments.
Figure 6:
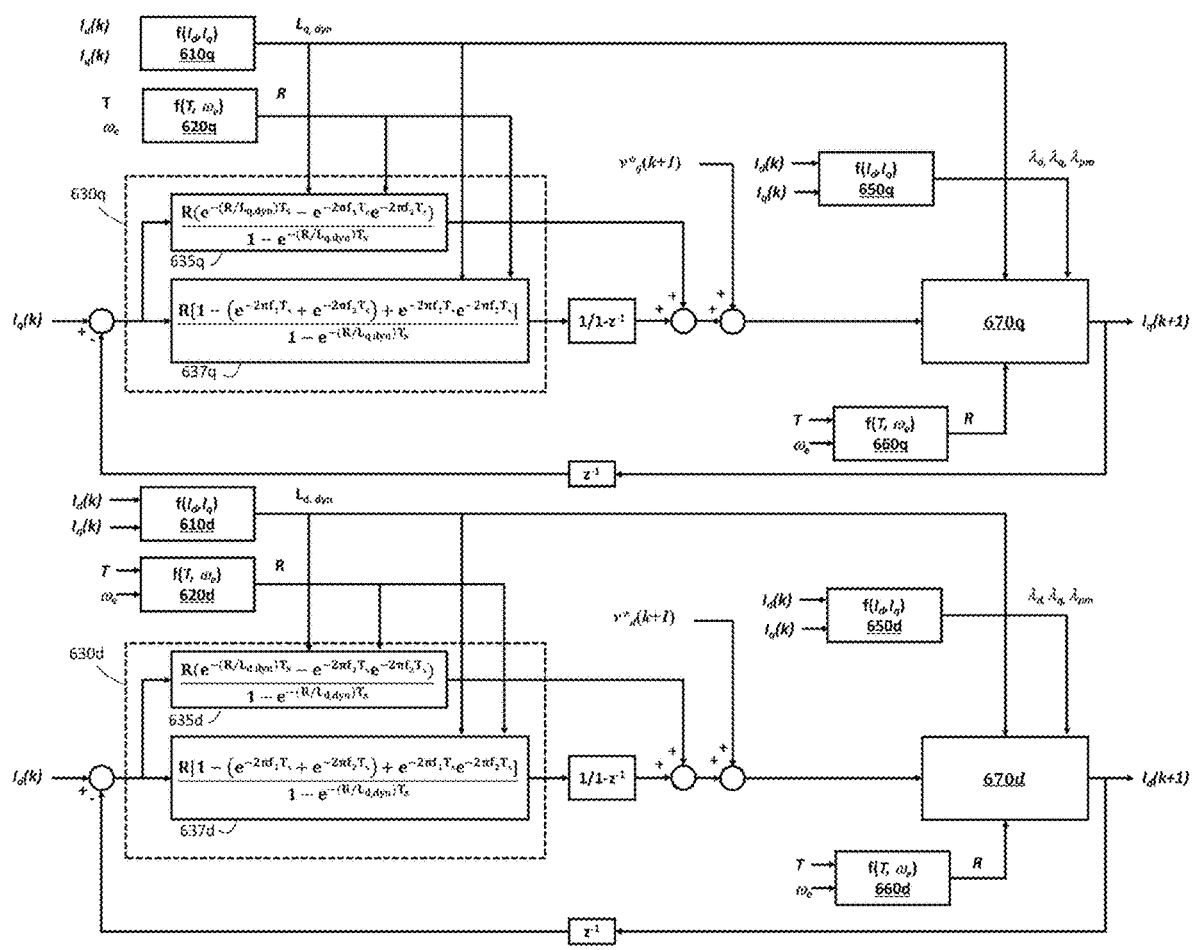
FIG. 6 is a schematic diagram of an exemplary current observer according to one or more embodiments.

FIG. 5 is a schematic diagram of an exemplary current observer 255 according to one or more embodiments. As previously noted, controllers 530d and 530q are used to ensure that motor models 570d and 570q, respectively, output predictions of current signals $I_d(k+1)$ and $I_q(k+1)$ that agree with the measured current signals $I_d(k)$ and $I_q(k)$ from the converter 250. As also noted for the embodiments shown in FIGS. 3 and 4, the parameters of one or more of the controllers 530 or motor models 570 may be tuned to provide a more accurate prediction of the current signals $I_d(k+1)$ and $I_q(k+1)$. The parameters may be direct-axis d or quadrature-axis q and may be static (stat) or dynamic (dyn) inductance L, resistance R, flux λpm of the electric traction motor 260, and the sampling period Ts. The blocks 510, 520, 540, 550, 560 that tune the parameters of the controller 530 and/or motor model 570 may provide the parameters based on a look-up table (LUT), a polynomial function, partial derivatives of a surface map of direct axis and quadrature axis flux versus current, $\lambda_d$ versus $I_d$ and $I_q$ and versus $I_d$ and $I_q$, respectively, or an online derivative calculation. In alternate embodiments, combinations of $I_d(k)$, $I_q(k)$, $I_d(k+1)$, $I_q(k+1)$, $I^*_d(k)$, $I^*_q(k)$ may be used find the accurate parameters. In addition, the frequencies $f_1$ and $f_2$ may be controlled to adjust the bandwidth of the controller 530 to reject errors in the sensor 245. The control of the frequencies $f_1$ and $f_2$ may be independent in the controllers 530d and 530q.

Unlike the embodiments shown in FIGS. 3 and 4, the embodiment shown in FIG. 5 does not include utilization of either of the predictions of current signals $I_d(k+1)$ and $I_q(k+1)$. Instead, decoupling between the direct-axis d and quadrature-axis q terms is accomplished by affecting the static inductance values $L_{d,\,stat}$ and $L_{q,\,stat}$ based on the measured current signal(s) ($I_d(k)$ and $I_q(k)$, respectively). In alternate embodiments, commanded currents $I^*_d(k)$, $I^*_q(k)$ may be used.

FIG. 6 is a schematic diagram of an exemplary current observer 255 according to one or more embodiments. As discussed for the embodiments of FIGS. 3-5, the current observer 255 includes direct-axis d or quadrature-axis q controllers 630 and motor models 670. As also previously noted, controllers 630d and 630q are used to ensure that motor models 670d and 670q, respectively, output predictions of current signals $I_d(k+1)$ and $I_q(k+1)$ that agree with the measured current signals $I_d(k)$ and $I_q(k)$ from the converter 250. Unlike the embodiments discussed with reference to FIGS. 3-5, the motor models 670d and 670q are low frequency models (i.e., used when the sampling frequency Fs is lower than when the motor models 370, 470, 570 are used).

As noted for the embodiments shown in FIGS. 3-5, the parameters of one or more of the controllers 630 or motor models 670 may be tuned to provide a more accurate prediction of the current signals $I_d(k+1)$ and $I_q(k+1)$. The parameters may be direct-axis d or quadrature-axis q dynamic (dyn) inductance L, resistance R, direct-axis d flux $\lambda_d$, quadrature-axis q flux $\lambda_q$, flux λpm of the electric traction motor 260, and the sampling period Ts. The blocks 610, 620, 650, 660 that tune the parameters of the controller 630 and/or motor model 670 may provide the parameters based on a look-up table (LUT), a polynomial function, partial derivatives of a surface map of direct axis and quadrature axis flux versus current, $\lambda_d$ versus $I_d$ and $I_q$ and versus $I_d$ and $I_q$, respectively, or an online derivative calculation. In addition, the frequencies $f_1$ and $f_2$ may be controlled to adjust the bandwidth of the controller 630 to reject errors in the sensor 245. The control of the frequencies $f_1$ and $f_2$ may be independent in the controllers 630d and 630q.

The motor models 670d and 670q differ from motor models 370, 470, 570. Specifically, the motor model 670q is given by:

$$I_q(k+1) = \frac{1}{L_d} A_0 \left\{ \left[ \frac{A_1 R}{L_q} + A_2 \right] V_q(k) \right. \quad [\text{EQ. 1}]$$
$$\left. + \left( \frac{A_1 R}{L_d} - A_3 \right) \lambda_d(k) - \omega_e [A_1 V_q(k) + A_2 \lambda_q(k)] + \frac{A_1 R}{L_q} \lambda_m \right\}$$

$$A_0 = \frac{e^{-\zeta \omega_n T_S}}{\omega_n^2 \sqrt{1-\zeta^2}} \quad [\text{EQ. 2}]$$

$$A_1 = \frac{\omega_n^2 \sqrt{1-\zeta^2}}{e^{-\zeta \omega_n T_S}} \sin\left(\sqrt{1-\zeta^2}\, \omega_n T_S\right) \quad [\text{EQ. 3}]$$

$$A_2 = \omega_n \sin\left(\sqrt{1-\zeta^2}\, \omega_n T_S\right) \quad [\text{EQ. 4}]$$

$$A_3 = \omega_n^2 \sin\left(\sqrt{1-\zeta^2}\, \omega_n T_S\right) \quad [\text{EQ. 5}]$$

$$\zeta = \frac{R_s(L_{d,stat} L_{q,stat})}{L_{d,stat} L_{q,stat}} \sqrt{\frac{1}{(R_s^2 + \omega_e^2 L_{d,stat} L_{q,stat}) L_{d,stat} L_{q,stat}}} \quad [\text{EQ. 6}]$$

$$\omega_n = \sqrt{\frac{R_s^2 + \omega_e^2 L_{d,stat} L_{q,stat}}{L_{d,stat} L_{q,stat}}} \quad [\text{EQ. 7}]$$

The motor model 670d is given by:

$$I_d(k+1) = \quad [\text{EQ. 8}]$$
$$\frac{1}{L_d} \left\{ A_0 \left[ \left[ \frac{A_1 R}{L_q} + A_2 \right] \left( V_d(k) + R \frac{\lambda_m}{L_d} \right) + \left( \frac{A_2 R}{L_q} - A_3 \right) \lambda_d(k) + \right. \right.$$
$$\left. \left. \omega_o [A_1 V_q(k) + A_2 \lambda_q(k)] \right\} - \lambda_m \right\}$$

Figure 7:
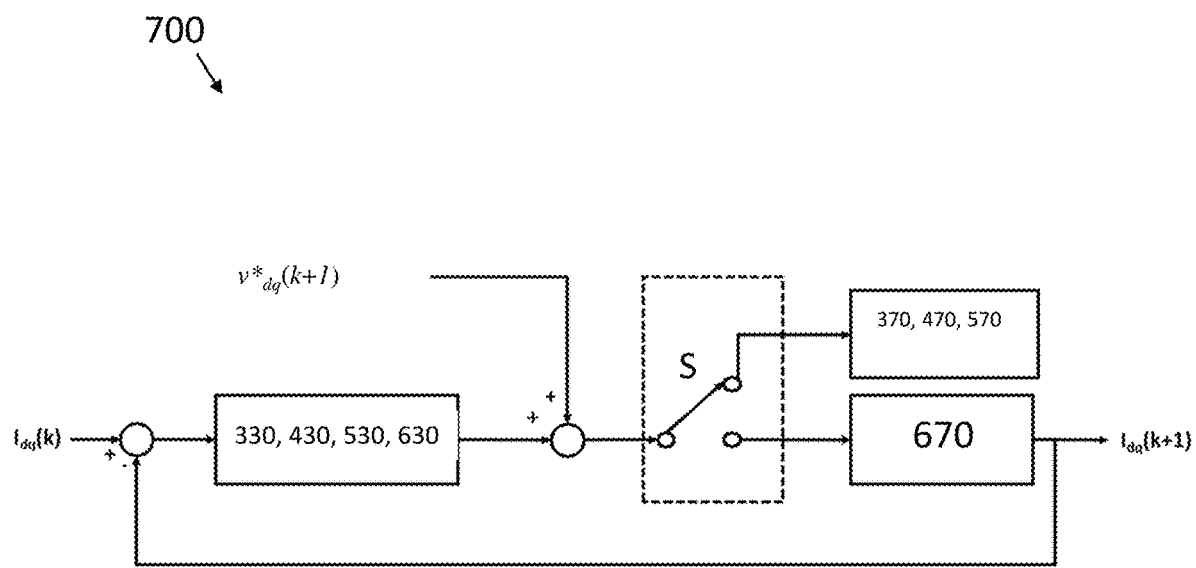
FIG. 7 is a block diagram of a current observer system according to one or more embodiments.

FIG. 7 is a block diagram of a current observer system 700 according to one or more embodiments. Direct-axis and quadrature-axis dq currents $I_{dq}$ at the current control cycle k are inputs as shown in FIGS. 3-6. As detailed in FIGS. 3-6, controller 330, 430, 530, 630 outputs and direct-axis and quadrature-axis dq voltage commands $v^*_{dq}$ are provided either to high Fs motor models 370d, 370q, 470d, 470q, 570d, 570q, as in the embodiments shown in FIGS. 3-5, or to low Fs motor models 670d, 670q, as in the embodiment shown in FIG. 6. The switch S that selects between the high Fs motor models 370d, 370q, 470d, 470q, 570d, 570q and the low Fs motor models 670d, 670q is based on a ratio Fs/Fe, where Fe is the frequency at which the electric traction motor 260 rotates.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system in a vehicle, comprising: a current regulator configured to obtain current commands from a controller based on a torque input and provide voltage commands;
    an inverter configured to use the voltage commands from the current regulator and direct current (DC) supplied by a battery to provide alternating current (AC); an electric traction motor configured to provide drive power to a transmission of the vehicle based on injection of the AC from the inverter;
    a current observer configured to obtain measured input current signals for a first control cycle and to provide predicted current signals for a next control cycle to the current regulator using a model, the current observer including a controller configured to check output of the model against the measured input current signals, and the current observer tuning parameters of the controller and the model used to generate the predicted current signals based on the measured input current signals,
    the current observer configured to select the model and tune of the parameters of the model according to a ratio of a sampling frequency to a frequency of the electric traction motor;
    and a converter that converts the AC, which is a three-phase AC, to a input direct-axis current signal and a input quadrature-axis current signal for the measured input current signals of the first control cycle, wherein the predicted current signals for the next control cycle include a direct-axis predicted current and a quadrature-axis predicted current, and the current observer includes a separate set of the controller and the model specific to the direct-axis predicted current and to the quadrature-axis predicted current.

2. The system according to claim 1, wherein a bandwidth of the controller specific to the direct-axis predicted current and a bandwidth of the controller specific to the quadrature-axis predicted current have independent adjustments to reject errors in a sensor that measures the AC.

3. The system according to claim 1, wherein the parameters of the controller and the model specific to the direct-axis predicted current and the parameters of the controller and the model specific to the quadrature-axis predicted current are tuned according to look-up tables, polynomial functions, partial derivatives of surface maps of direct-axis and quadrature-axis flux versus current, or an online derivative calculation.

4. The system according to claim 1, wherein the current observer uses the quadrature-axis predicted current to obtain the direct-axis predicted current or the current observer uses the direct-axis predicted current to obtain the quadrature-axis predicted current.

5. The system according to claim 1, wherein the current observer uses the quadrature-axis predicted current to obtain the direct-axis predicted current and the current observer also uses the direct-axis predicted current to obtain the quadrature-axis predicted current.

6. The system according to claim 1, wherein the current observer additionally tunes a direct-axis static inductance parameter of the model used to provide the quadrature-axis predicted current based on the input quadrature-axis current.

7. The system according to claim 6, wherein the current observer additionally tunes a quadrature-axis static inductance parameter of the model used to provide the direct-axis predicted current based on the input quadrature-axis current.

8. The system according to claim 1, wherein a delayed version of the direct-axis predicted current is checked with the input direct-axis current and a delayed version of the quadrature-axis predicted current is checked with the input quadrature-axis current.

9. The system according to claim 1, wherein the current observer is configured to select the model and tune of the parameters of the model according to a ratio of a sampling frequency to a frequency of the electric traction motor.

10. A method for controlling the operation of an electric traction motor of a vehicle, the method comprising: arranging a current regulator to obtain current commands from a controller based on a torque input and provide voltage commands;
arranging an inverter to use the voltage commands from the current regulator and direct current (DC) supplied by a battery to provide alternating current (AC);
arranging the electric traction motor to provide drive power to a transmission of the vehicle based on injection of the AC from the inverter;
configuring a current observer to obtain measured input current signals for a first control cycle and to provide predicted current signals for a next control cycle to the current regulator using a model, the current observer including a controller configured to check output of the model against the measured input current signals, and the current observer tuning parameters of the controller and the model used to generate the predicted current signals based on the measured input current signals;
arranging a converter between the inverter and the current observer to convert the AC, which is a three-phase AC, to a input direct-axis current signal and a input quadrature-axis current signal for the measured input current signals of the first control cycle, wherein the predicted current signals for the next control cycle include a direct-axis predicted current and a quadrature-axis predicted current, and the current observer includes a separate set of the controller and the model specific to the direct-axis predicted current and to the quadrature-axis predicted current;
the current observer configured to select the model and tune of the parameters of the model according to a ratio of a sampling frequency to a frequency of the electric traction motor;
and operating the vehicle using the electric traction motor.

11. The method according to claim 10, further comprising independently adjusting a bandwidth of the controller specific to the direct-axis predicted current and a bandwidth of the controller specific to the quadrature-axis predicted current to reject errors in a sensor that measures the AC.

12. The method according to claim 10, wherein the tuning the parameters of the controller and the model specific to the direct-axis predicted current and the parameters of the controller and the model specific to the quadrature-axis predicted current is according to look-up tables, polynomial functions, partial derivatives of surface maps of direct-axis and quadrature-axis flux versus current, or an online derivative calculation.

13. The method according to claim 10, further comprising the current observer using the quadrature-axis predicted current to obtain the direct-axis predicted current or using the direct-axis predicted current to obtain the quadrature-axis predicted current.

14. The method according to claim 10, further comprising the current observer using the quadrature-axis predicted current to obtain the direct-axis predicted current and the current observer also using the direct-axis predicted current to obtain the quadrature-axis predicted current.

15. The method according to claim 10, further comprising the current observer additionally tuning a direct-axis static inductance parameter of the model used to provide the quadrature-axis predicted current based on the input quadrature-axis current.

16. The method according to claim 15, further comprising the current observer additionally tuning a quadrature-axis static inductance parameter of the model used to provide the direct-axis predicted current based on the input quadrature-axis current.

17. The method according to claim 10, further comprising checking a delayed version of the direct-axis predicted current with the input direct-axis current and checking a delayed version of the quadrature-axis predicted current with the input quadrature-axis current.

18. The method according to claim 10, further comprising the current observer selecting the model and tuning the parameters of the model according to a ratio of a sampling frequency to a frequency of the electric traction motor.

19. The method according to claim 10, wherein a delayed version of the direct-axis predicted current is checked with the input direct-axis current and a delayed version of the quadrature-axis predicted current is checked with the input quadrature-axis current.

* * * * *